United States Patent [19]

Lee

[11] Patent Number: 4,806,573

[45] Date of Patent: Feb. 21, 1989

[54] POLYIMIDE FOAM PRECURSOR AND ITS USE IN REINFORCING OPEN-CELL MATERIALS

[75] Inventor: Kyu W. Lee, Danville, Calif.

[73] Assignee: Hexcel Corporation, San Francisco, Calif.

[21] Appl. No.: 209,760

[22] Filed: Jun. 22, 1988

Related U.S. Application Data

[62] Division of Ser. No. 905,718, Sep. 9, 1986, abandoned.

[51] Int. Cl.⁴ ............................................... C08J 9/00
[52] U.S. Cl. .................................... 521/157; 521/126; 521/127; 521/183; 521/77; 528/73
[58] Field of Search ............... 521/126, 127, 157, 183; 528/73

[56] References Cited

U.S. PATENT DOCUMENTS

| | | | |
|---|---|---|---|
| 3,922,238 | 11/1975 | Narayan et al. | 260/2.5 BF |
| 4,001,186 | 1/1977 | Onder | 260/63 N |
| 4,021,412 | 5/1977 | Onder | 260/63 N |
| 4,029,611 | 6/1977 | Cenker et al. | 260/2.5 AW |
| 4,184,021 | 1/1980 | Frosch et al. | 54/114 |
| 4,263,410 | 4/1981 | Tung et al. | 521/157 |

OTHER PUBLICATIONS

N. D. Ghatge et al., "Polyimides from Diisocyanates and Dianhydride", *Jour. Polymer Science*, vol. 18, 1980.
William M. Alvino et al., "Polyimides from Diisocyanates, Dianhydrides, and Tetracarboxylic Acids", *Jour. Applied Polymer Science*, vol. 19, 1975.
R. A. Meyers, "The Polymerization of Pyromellitic Dianhydride with Diphenylmethane Diisocyanate", *Jour. Polymer Science*, vol. 7, 1969.

*Primary Examiner*—Morton Foelak
*Attorney, Agent, or Firm*—Townsend and Townsend

[57] ABSTRACT

Open-cell structures are filled with polyimide foam formed in place by the use of a foam precursor in powdered form comprised of a combination of (a) the reaction product of an excess of organic polyisocyanate and a member selected from the group consisting of furfuryl alcohol and condensation products thereof, and (b) an organic polycarboxylic compound containing two carboxylic anhydride groups. The precursor is prepared by combining the species under conditions which favor the reaction of the furfuryl alcohol with the polyisocyanate, but not the polyimide-forming reaction. The polyimide-forming reaction itself is then performed by adding preselected amounts of the powdered precursor, depending on the desired ultimate density of the foam, to each cell of the open-cell structure, then heating to initiate the polyimide reaction, and permitting the carbon dioxide generated by the reaction to escape while confining the resulting foam to the cells.

15 Claims, 3 Drawing Sheets

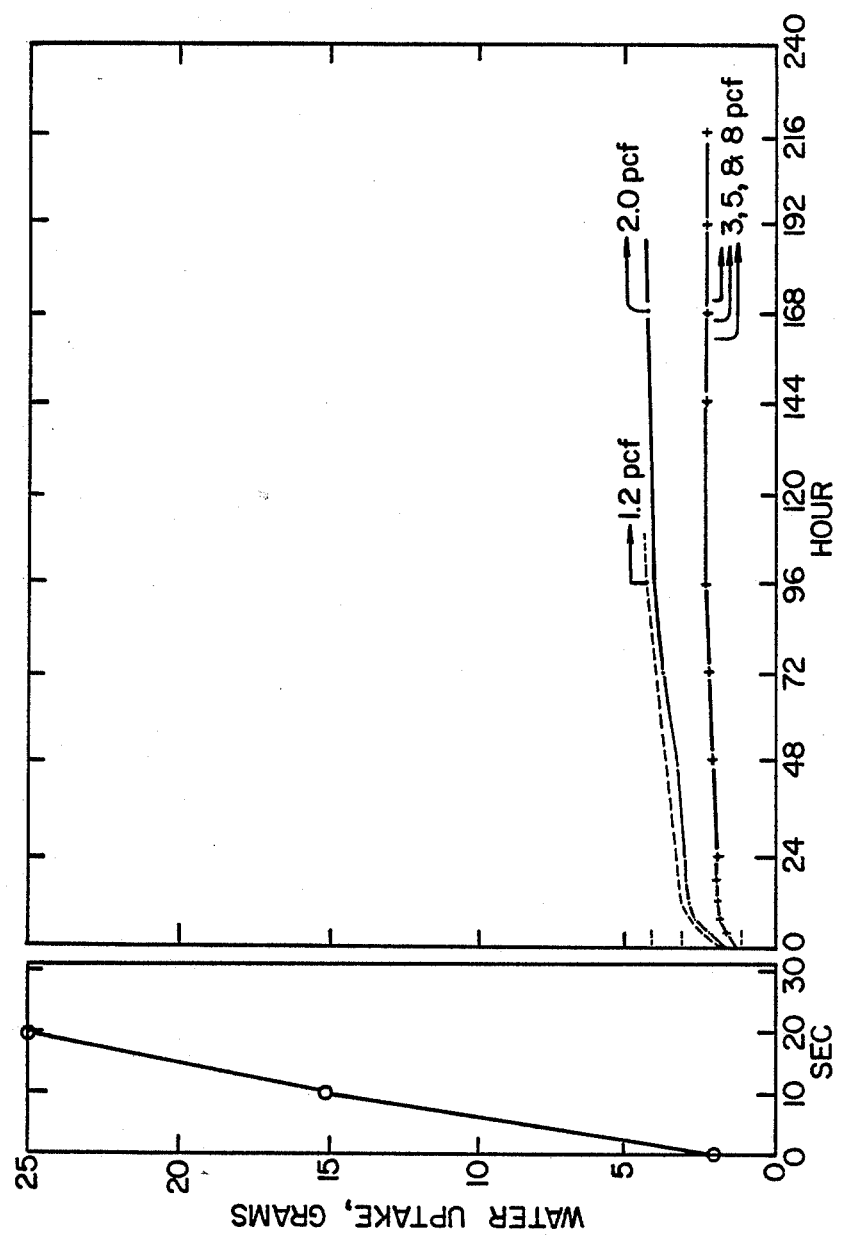
FIG._1.

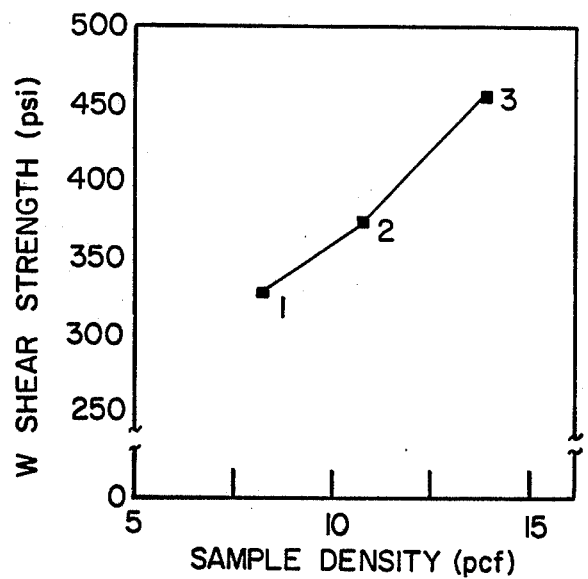
FIG._2.
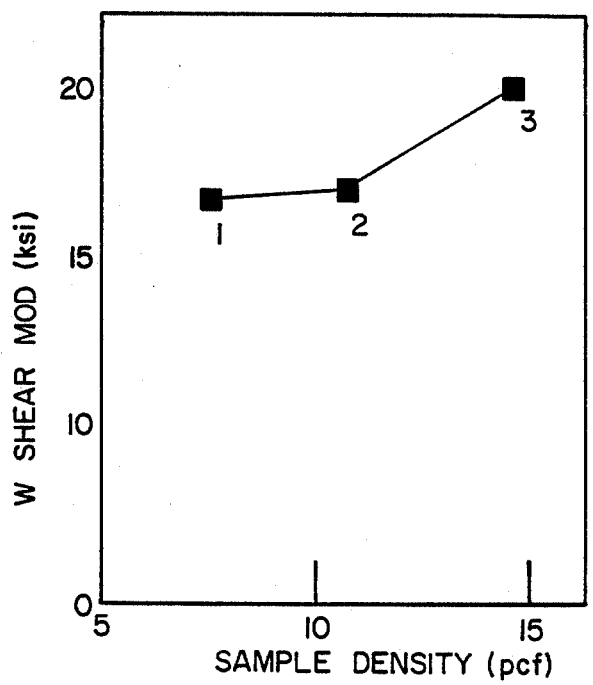
FIG._3.

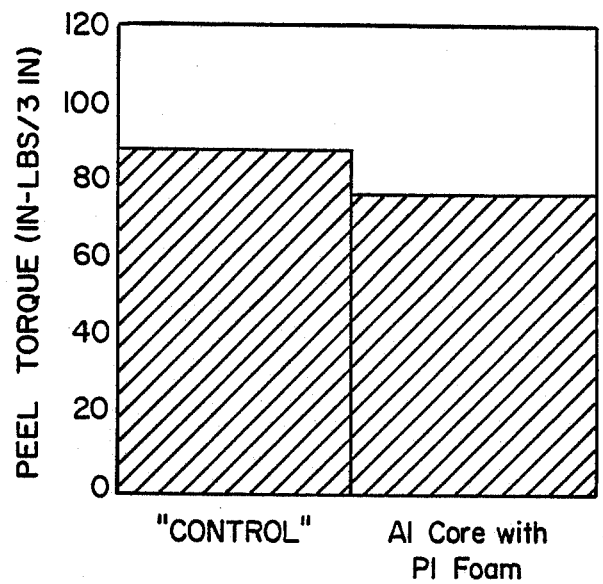
FIG._4a.
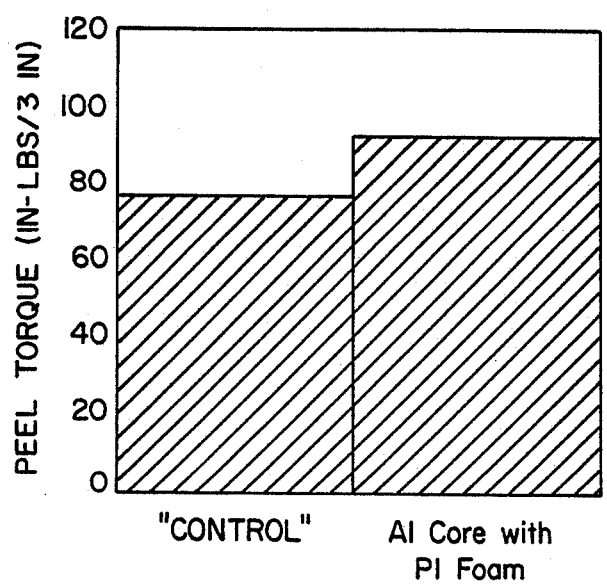
FIG._4b.

POLYIMIDE FOAM PRECURSOR AND ITS USE IN REINFORCING OPEN-CELL MATERIALS

This is a division of application Ser. No. 905,718, filed Sept. 9, 1986, now abandoned.

BACKGROUND OF THE INVENTION

The present invention relates to polyimide foams prepared by the reaction between polyisocyanates and dianhydrides, and to the use of such foams in filling the voids in a cellular material such as honeycomb cell networks used as lightweight materials of construction.

Rigid cellular materials are used in a wide range of applications where low density must be maintained. The aerospace industry, for example, uses such materials extensively. For added strength and durability as well as control of properties, the cells are filled with a polymeric foam. Polyimide foams formed in such materials by the reaction of polyisocyanates and dianhydrides are desirable since the foaming is caused by the generation of carbon dioxide rather than water, thus avoiding the need for insuring that water is removed entirely prior to quenching the reaction. Unfortunately, the precursors for this type of reaction are generally in the slurry or semi-liquid state, which makes transportation and handling difficult, particularly when one seeks to perform the foaming reaction in place inside the cell structure. Externally prepared foams may be inserted in the cells either by first being pulverized to a granulated form or by being forcefully inserted as a continuous mass, in which case they are cut to size by the cell structure itself. These are awkward, unreliable procedures and are difficult to control.

SUMMARY OF THE INVENTION

The present invention provides a novel product in the form of a friable foam precursor which is curable to a polyimide foam by the polyisocyanate/dianhydride reaction, and is pulverizable to fine particulate form for insertion of controlled amounts into cell structures with very small cell spaces. The invention enables one to place highly controlled amounts of finely powdered foam precursor inside the cells, then fill the cells with foam by foaming the precursor in place. The result is a rigid, stabilized product with a foam filler held securely inside, and a high degree of uniformity and density control in the final product. The use of all solid ingredients ground to a fine powder form and the lack of volatiles provides considerable ease of processing the material. In addition, the resulting foam imparts improved properties to the final product, including a low dielectric constant, a low degree of water ingression, and an enhanced ability to withstand high temperatures.

The foam precursor of the invention is a solid phase material comprised of (a) the reaction product of an excess of organic polyisocyanate and a member selected from the group consisting of furfuryl alcohol and condensation products thereof, and (b) an organic polycarboxylic compound containing two carboxylic anhydride groups. The invention further resides in a method for preparing such a precursor by combining these three species under conditions which promote the reaction of the furfuryl alcohol with the polyisocyanate, but not the polyimide-forming reaction. This is preferably done in the presence of a catalyst of the type known for use in promoting urethane formation, at temperatures less than about 150° F. (66° C.). A surface active agent is also preferably included to promote the uniformity of the precursor and to facilitate the pulverization of the solid into fine particulate form. The inclusion also promotes the uniformity of the polyimide foam which results when the foam precursor cures and expands. Finally, methods are disclosed for using such a foam precursor and reinforcing an open-celled material by causing the polyimide-forming reaction to occur in place, thereby filling the cells to the desired density with a polyimide foam.

BRIEF DESCRIPTION OF THE DRAWINGS

FIG. 1 is a plot of water uptake vs. time, representing a water ingression test performed on a sample of foam-filled honeycomb prepared in accordance with the present invention.

FIG. 2 is a plot of shear strength vs. sample density taken from samples of foam-filled honeycomb prepared in accordance with the present invention.

FIG. 3 is a plot of shear modulus vs. sample density for the same samples as those shown in FIG. 2.

FIG. 4a and 4b are comparisons of peel torque between honeycomb samples with and without foam-filled interiors, at two curing temperatures of the adhesive holding the peel sheet to the honeycomb.

DETAILED DESCRIPTION OF THE INVENTION

The organic polyisocyanates referred to herein cover a broad range of compounds varying widely in molecular weight and formula. In general, these compounds are of the formula:

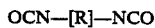

OCN—[R]—NCO in which R is a divalent radical selected from the group consisting of phenyl, naphthyl, $C_5$–$C_8$ cycloalkyl, diphenyl, diphenyl-($C_1$–$C_3$ alkylene), di($C_5$–$C_8$ cycloalkyl)-($C_1$–$C_3$ alkylane), and $C_2$–$C_{12}$ alkylene.

The term "diphenyl" is used herein to denote two phenyl rings connected by a single covalent bond, the two linkages to the isocyanate groups preferably being one on each of the two phenyl rings. The term "diphenylalkylene" refers to two phenyl rings separated by an alkylene linkage, with the isocyanate groups preferably being one on each phenyl ring. Similarly, the term "dicycloalkylalkylene" refers to two cycloalkyl groups of the same or different size, connected by an alkylene linkage, with the isocyanate groups preferably being one on each of the saturated rings.

Also contemplated as organic polyisocyanate candidates are derivatives of the aromatic and alicyclic moieties mentioned above, where $C_1$–$C_3$ alkylene, preferably methylene, linkages are inserted between the R group and one or both of the isocyanate groups, as well as ($C_1$–$C_3$ alkyl)-substituted, preferably methyl-substituted derivatives thereof, biuret derivatives thereof, carbodiimidized derivatives thereof, and oligomers thereof.

The following are examples of polyisocyanates within the scope of the above description.

Toluene diisocyanate (2,4- and mixtures of 2,4- and 2,6-)(TDI)

Diphenylmethane-4,4'-diisocyanate(MDI) and carbodiimidized derivatives thereof

Polymethylene polyphenyl isocyanate(PMPPI)

4,4'-Dicyclohexylmethane diisocyanate

Tolidene diisocyanate (3,3'-diphenyl-4,4'-diisocyanate)

Hexamethylene diisocyanate and the biuret derivative thereof
2,2,4,4-Tetramethyl hexamethylene diisocyanate
2,4,4-Trimethyl hexamethylene diisocyanate
3-Isocyanatomethyl-3,5,5-trimethylcyclohexyl isocyanate(IPDI)
Phenyl-1,4-diisocyanate(PPDI)
Naphthyl-1,5-diisocyanate(NDI)
1,3-Diisocyanatomethyl benzene
Cyclohexyl-1,4-diisocyanate
1,4-Diisocyanatomethyl cyclohexane
1,3-Diisocyanatomethyl cyclohexane
Dicyclohexylmethane-4,4'-diisocyanate Within the broad range indicated above, certain polyisocyanates are preferred, namely those in which R is a divalent radical selected from the group consisting of phenyl, diphenyl and diphenylmethylene, as well as methyl-substituted derivatives of such radicals and oligomers thereof. A particularly preferred group of polyisocyanates are toluene diisocyanate(2,4-, 2,6- and combinations), 4,4'-methylenebis(-phenylisocyanate)(MDI) and polymethylene polyphenyl isocyanate(PAPI, Upjohn Company, Kalamazoo, Mich.).

The furfuryl alcohol condensation products include products of the condensation of two or more molecules of furfuryl alcohol, or of furfuryl alcohol with formaldehyde, furfural, urea, or mixtures thereof. Preferred species within this group are oligomers of furfuryl alcohol, with furfuryl alcohol itself being most preferred.

The dianhydride may be any of a wide range of organic polycarboxylic compounds having two carboxylic anhydride groups. Examples are as follows:
Pyromellitic dianhydride
Benzene-1,2,3,4-tetracarboxylic dianhydride
Diphenyltetracarboxylic dianhydride(3,3',4,4'; 2,2',3,3')
Naphthalenetetracarboxylic dianhydride (2,3,6,7; 1,2,4,5; 1,4,5,8)
Decahydronapthalen-1,4,5,8-tetracarboxylic dianhydride
4,8-Dimethyl-1,2,3,5,6,7-hexahydronaphthalene-1,2,5,6-tetacarboxylic dianhydride
2,6-Dichloronaphthalene-1,4,5,8-tetracarboxylic dianhydride
2,7-Dichloronaphthalene-1,4,5,8-tetracarboxylic dianhydride
2,3,6,7-Tetrachloronaphthalene-1,4,5,8-tetracarboxylic dianhydride
phenanthrene-1,3,9,10-tetracarboxylic dianhydride
Perylene-3,4,9,10-tetracarboxylic dianhydride
Bis(2,3-dicarboxyphenyl)methane dianhydride
Bis(3,4-dicarboxyphenyl)methane dianhydride
1,1-Bis(2,3-dicarboxyphenyl)ethane dianhydride
1,1-Bis(3,4-dicarboxyphenyl)ethane dianhydride
2,2-Bis(2,3-dicarboxyphenyl)propane dianhydride
2,3-Bis(3,4-dicarboxyphenyl)propane dianhydride
Bis(3,4-dicarboxyphenyl)sulfone dianhydride
Bis(3,4-dicarboxyphenyl)ether dianhydride
Ethylene tetracarboxylic acid dianhydride
Butane-1,2,3,4-tetracarboxylic dianhydride
Cyclopentane-1,2,3,4-tetracarboxylic dianhydride
Pyrrolidine-2,3,4,5-tetracarboxylic dianhydride
Pyrazine-2,3,5,6-tetracarboxylic dianhydride
Thiophen-2,3,4,5-tetracarboxylic dianhydride
Benzophenone-3,3',4,4'-tetracarboxylic dianhydride Preferred species within this broad range are aromatic dianhydrides, such as those containing benzene, naphthalene, phenanthrene, diphenyl and benzophenone central moieties. Particularly preferred species are pyromellitic dianhydride and benzophenone tetracarboxylic dianhydride.

In the precursor of the present invention, the organic polyisocyanate is used in excess of the furfuryl alcohol or furfuryl alcohol condensation product. The term "excess" is used here in reference to the reactive moieties which would take part in a urethane-forming reaction. Thus, the typical dianhydride has two such moieties and furfuryl alcohol itself has one. The molecular weight divided by the number of such reactive sites on a particular molecule is used herein as an equivalent weight. Likewise, excesses when expressed in percents on an equivalent basis refer to weights in excess of an equivalent weight based on the reaction between an equal number of equivalents of both the organic polyisocyanate and the furfuryl alcohol or its condensation product. In preferred embodiments of the invention, this excess is at least about 10% (on an equivalent basis), while in further preferred embodiments the excess is from about 100% to about 1,000%, and in still further preferred embodiments from about 200% to about 500%.

Likewise, the relative amounts of dianhydrides and polyisocyanates are expressed as an equivalent ratio of the former to the latter, referring to the number of equivalents of one divided by the number of equivalents of the other. In preferred embodiments, the equivalent ratio of the dianhydride to the polyisocyanate is from about 0.2 to about 1.0, while in further preferred embodiments, this ratio is from about 0.5 to about 0.9.

It is further preferred to include a catalyst in the composition for the reaction between the polyisocyanate and the furfuryl species. Urethane-promoting catalysts are suitable for this purpose, particularly metal salts of carboxylic acids, organometallic salts of carboxylic acids and tertiary amines. Examples of metal salts in this group or dibutyltin dilaurate, dibutyltin diacetate, stannous octoate, lead octoate, and cobalt naphthenate. Examples of organometallic salts are organotitanium and organoaluminum salts of the same or similar carboxylic acids. Examples of tertiary amines are triethylenediamine, triethylamine, diethylcyclohexylamine, methylmorpholine, trimethylpiperazine and N-ethylmorpholine. Preferred catalysts among these types are the metal salts of carboxylic acids, particularly the tin salts, with dibutyltin dilaurate, dibutyltin diacetate and stannous octoate particularly preferred.

The amount of catalyst used is not critical. Any amount providing a catalytic effect may be used. In most cases, this amount will range from about 0.01% to about 0.50% by weight based on the total precursor composition.

Surfactants may also be included to promote the uniformity of the precursor and facilitate its pulverization to powder form. The inclusion also promotes the uniformity of the polyimide foam which results when the foam precursor cures and expands. A wide variety of surfactants are known among those skilled in the art. The amount is not critical, although in most cases an amount ranging from about 0.5% to about 10% by weight based on the total precursor composition will provide the best results.

The precursor of the present invention is generally used in particulate form for purposes of uniformity and ease of controlling the amounts in each cell of the structure being reinforced. With these considerations in mind, the particle size may be varied widely. In most applications, however, particles having an average diameter of about 500 microns or less, preferably from about 10 microns to 1000 microns, will provide the best results.

The precursor is prepared by combining the above-mentioned components under conditions which will promote the reaction of the furfuryl alcohol or its condensate with the isocyanate, but at the same time will permit substantially no polyimide formation to occur. With the urethane-type catalyst present, this is usually done by controlling the temperature to about 150° F. (66° C.) or less, preferably about 100° F. (38° C.) or less. This may be done by controlling the quantities of the components or the rates of addition so that the exothermal effect of the reaction between the furfuryl alcohol and the polyisocyanate does not cause the temperature to rise excessively. The pressure is not critical; atmospheric pressure will suffice. Some expansion of the volume of the ingredients will occur during the combination due to foaming caused by the reaction between the furfuryl alcohol and the polyisocyanate. Once all volatiles (such as those resulting from the condensation reaction) have been removed, the solid precursor is comminuted to particulate form according to conventional techniques, notably crushing or grinding.

The particulate precursor is then inserted into the open cells of the material to be reinforced. A wide range of applications is contemplated, since the actual cell configurations and materials are not critical. The invention finds particular utility in honeycomb structures, with walls of a wide variety of materials, including paper, plastic, Fiberglas and metals.

The cells of the structural material are partially filled with a preselected amount of the powdered precursor. The amount is calculated to provide the desired final density when the precursor is expanded during the foaming that occurs upon curing to fill the entire volume of each cell.

Curing of the precursor to form the polyimide foam may be achieved according to conventional techniques. A preferred method involves heating the open cell structure containing the powdered precursor to a temperature ranging from about 250° F. (121° C.) to about 450° F. (232° C.). The pressure during the curing may likewise be varied. Subatmospheric pressures may be used to accelerate the expansion by increasing the foaming, while superatmospheric pressures may be used to limit the expansion. In general, atmospheric pressure will suffice. Cure conditions are maintained for a sufficient period of time to complete the reaction.

Control of the rate and extent of foam expansion during curing may be achieved by closing off the cell openings prior to curing with a material which is permeable to carbon dioxide but impermeable to the polyimide foam. This will permit the curing reaction to proceed to completion, permitting the carbon dioxide given off by the reaction to escape while retaining the solid product within the confines of the cells. Once the foam is fully cured, the material is removed. Suitable materials include cloth, Fiberglas, and porous paper. A liner material may also be included to prevent the foam from sticking to the material.

As an optional variation, the precursor may be combined with other filler materials, including foam-forming materials (commonly known as "prepregs"), in order to modify the properties of the final product according to the specifications sought for the product's use. These supplementary materials may be precursors for other types of polyimide foams, including those which release water and/or other volatiles during imidization.

The following example is offered for illustrative purposes and is intended neither to define or limit the invention in any manner.

EXAMPLE

The following two compositions were prepared separately:

|   |   | (parts by weight) |
|---|---|---|
| A. | PAPI 580 (a polymethylene polyphenyl isocyanate) | 100 |
|   | T-9 (a stannous octoate solution) | 0.625 |
| B. | BTDA (polymer grade, fine) | 100 |
|   | furfuryl alcohol | 37.5 |
|   | Dow Corning 193 (a surfactant) | 4.76 |

The compositions were combined at a weight ratio of 1.41 (B:A) in a controlled manner to limit the exothermic temperature rise to 150° F. (66° C.). After all volatiles had been removed, the resulting solid product was ground to an average particle size of approximately 200 microns.

The powdered product was then added to a series of honeycomb materials of various kinds at amounts calculated to achieve a range of preselected final densities, and cured in place while the cell openings were closed off with a porous pad of nylon peel ply obtained from Burlington Industries.

Water Ingression Tests

Water-permeable Kraft paper honeycomb having a cell width of ⅜ inch (0.9 cm) and thickness of ½ inch (1.3 cm) was used in this test. Amounts of the powdered foam precursor were added to achieve final foam densities ranging from 1.2 to 8 pounds per cubic foot (pcf) (0.02 to 0.13 g/cc). Curing was then done at 350° F. (177° C.) for one hour.

The rate of water infiltration in the direction transverse to the axes of the cells was determined by inserting a tube 0.25 inch (0.6 cm) in diameter with perforated walls at one end into a block of the honeycomb measuring 5 inches (12.7 cm) square, and weighing the block periodically to monitor the water intake. The results are shown in FIG. 1, where the plot at the left represents the honeycomb with no filler, and the plots at the right represent the honeycomb with foam fillers at densities of 1.2, 2.0, 3.5 and 8 pcf. The data indicate almost total elimination of water ingression by use of the foam.

Shear Strength Tests

Hexcel Fiberglas honeycomb HRH-327 blocks having cells of 3/16 inch (0.5 cm) width and a thickness of 0.5 inch (1.3 cm) was filled with foam to foam densities of 4 and 6 pcf (0.064 and 0.096 g/cubic cm). The samples were then subjected to a shearing force in the direction perpendicular to the block facings (parallel to the direction of expansion of the foam). FIG. 2 is a plot of the shear force in pounds per square inch (convertible to newtons per square centimeter by multiplying by 0.68947) at the breakpoint, and FIG. 3 is a plot of the shear modulus, both vs. the total sample density (foam plus honeycomb). In each plot the point designated 1 represents the honeycomb without foam, while the points designated 2 and 3 represent foam densities of 4 and 6 pcf, respectively. The data indicate improvements in both breakpoint and modulus due to the presence of the foam.

Peel Strength Tests

An aluminum honeycomb core having cells of 0.25 inch width (0.6 cm) and a thickness of 0.5 inch (1.3 cm) was filled with a foam to foam density of 7-8 pcf (0.11-0.13 g/cubic cm), and an aluminum facing was bonded to the open ends of the cells by a film adhesive designated AF126 (3M Company, St. Paul, Minn.). The adhesive was cured at temperatures of 250° F. (121° C.) and 350° F. (177° C.). The torque in inch-pounds per cubic inch required to peel the facing sheets from the honeycomb is shown in bar graphs in FIGS. 4a (250° F. curing) and 4b (350° F. curing). In each case the bar at the left represents a sample with no foam filling while the bar at the right is the foam-filled sample. The foam improved the bonding strength at an adhesive cure temperature of 350° F.

The foregoing description is offered primarily for purposes of illustration. It will be readily apparent to those skilled in the art that modifications and variations of the specific embodiments and procedures described herein may be introduced without departing from the spirit and scope of the invention.

What is claimed is:

1. A solid phase polyimide foam precursor comprising:
   (a) the reaction product of an excess of an organic polyisocyanate and a member selected from the group consisting of furfuryl alcohol and condensation products thereof; and
   (b) an organic polycarboxylic compound containing two carboxylic anhydride groups.

2. A solid phase polyimide foam precursor in accordance with claim 1 in which said organic polyisocyanate is of the formula:

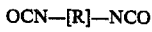

in which R is a divalent radical selected from the groups consisting of phenyl, naphthyl, $C_5$-$C_8$ cycloalkyl, diphenyl, diphenyl-($C_1$-$C_3$ alkylene), di-($C_5$-$C_8$ cycloalkyl)-($C_1$-$C_3$ alkylene), and $C_2$-$C_{12}$ alkylene; and derivatives thereof containing $C_1$-$C_3$ alkylene linkages to one or both isocyanate groups, ($C_1$-$C_3$ alkyl)-sbstituted derivatives thereof, biuret derivatives thereof, carbodiimidized derivatives thereof, and oligomers thereof.

3. A solid phase polyimide foam precursor in accordance with claim 1 in which said organic polyisocyanate is of the formula:

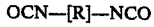

in which R is a divalent radical selected from the group consisting of phenyl, diphenyl, and diphenylmethylene; and methyl-substituted derivatives thereof and oligomers thereof.

4. A solid phase polyimide foam precursor in accordance with claim 1 in which said organic polyisocyanate is a member selected from the group consisting of toluene diisocyanate, 4,4'-methylenebis(phenyl isocyanate) and polymethylene polyphenyl isocyanate.

5. A solid phase polyimide foam precursor in accordance with claim 1 in which said organic polycarboxylic compound is an aromatic dianhydride.

6. A solid phase polyimide foam precursor in accordance with claim 1 in which said organic polycarboxylic compound is a member selected from the group consisting of pyromellitic dianhydride and benzophenonetetracarboxylic dianhydride.

7. A solid phase polyimide foam precursor in accordance with claim 1 in which said reaction product is the reaction product of an excess of an organic polyisocyanate and a member selected from the group consisting of furfuryl alcohol and oligomers thereof.

8. A solid phase polyimide foam precursor in accordance with claim 1 in which said organic polyisocyanate is in at least 10% excess on an equivalent basis with respect to said member of the group consisting of furfuryl alcohol and condensation products thereof.

9. A solid phase polyimide foam precursor in accordance with claim 1 in which component (e) is the reaction product of an excess of an organic polyisocyanate and furfuryl alcohol and said organic polyisocyanate is in from about 100% to about 1,000% excess on an equivalent basis with respect to said furfuryl alcohol.

10. A solid phase polyimide foam precursor in accordance with claim 1 in which component (e) is the reaction product of an excess of an organic polyisocyanate and furfuryl alcohol and said organic polyisocyanate is in from about 200% to about 500% excess on an equivalent basis with respect to said furfuryl alcohol.

11. A solid phase polyimide foam precursor in accordance with claim 1 in which the equivalent ratio of said organic polycarboxylic compound to said organic polyisocyanate is from about 0.2 to about 1.0.

12. A solid phase polyimide foam precursor in accordance with claim 1 in which the equivalent ratio of said organic polycarboxylic compound to said organic polyisocyanate is from about 0.5 to about 0.9.

13. A solid phase polyimide foam precursor in accordance with claim 1 which has been pulverized to an average article diameter of from about 10 microns to about 1000 microns.

14. A solid phase polyimide foam precursor comprising:
   (a) the reaction product of (i) an organic polyisocyanate of the formula:

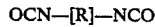

in which R is a divalent radical selected from the group consisting of phenyl, diphenyl, and diphenylmethylene, and methyl-substituted derivatives thereof and oligomers thereof; and (ii) furfuryl alcohol; where said organic polyisocyanate is in from about 100% to about 1,000% excess on an equivilent basis with respect to said furfuryl alcohol; and
   (b) an aromatic organic polycarboxylic compound containing two carboxylic anhydride groups, at an equivalent ratio of from about 0.2 to about 1.0 with respect to said organic polyisocyanate.

15. A solid phase polyimide foam precursor polyisocyanate comprising:
   (a) the reaction product of (i) an organic polyisocyanate selected from the group consisting of toluene diisocyanate, 4,4'-methylenebis(phenyl isocyanate) and polymethylene polyphenylisocyanate, and (ii) furfuryl alcohol, where reactant (i) is in from about 200% to above 500% excess on an equivalent basis with respect to component (ii); and
   (b) a dianhydride selected from the group consisting of pyromellitic dianhydride and benzophenonetetracarboxylic dianhydride, at an equivalent ratio of from about 0.5 to about 0.9 with respect to said organic polyisocyanate.

* * * * *